(12) United States Patent
Nakayama et al.

(10) Patent No.: US 7,917,027 B2
(45) Date of Patent: Mar. 29, 2011

(54) ACTUATOR BODY AND THROTTLE MECHANISM

(75) Inventors: Minoru Nakayama, Suita (JP); Noboru Tanaka, Suita (JP); Kouichi Yamaguchi, Suita (JP)

(73) Assignee: Eamex Corporation, Osaka (JP)

( * ) Notice: Subject to any disclaimer, the term of this patent is extended or adjusted under 35 U.S.C. 154(b) by 0 days.

(21) Appl. No.: 12/594,467

(22) PCT Filed: Mar. 13, 2008

(86) PCT No.: PCT/JP2008/054588
§ 371 (c)(1),
(2), (4) Date: Oct. 2, 2009

(87) PCT Pub. No.: WO2008/126613
PCT Pub. Date: Oct. 23, 2008

(65) Prior Publication Data
US 2010/0135649 A1    Jun. 3, 2010

(30) Foreign Application Priority Data
Apr. 9, 2007  (JP) ................. 2007-101760

(51) Int. Cl.
  *G03B 7/085*  (2006.01)
  *G02F 1/00*  (2006.01)
(52) U.S. Cl. ........................ 396/261; 396/506
(58) Field of Classification Search .......... 396/261
See application file for complete search history.

(56) References Cited

U.S. PATENT DOCUMENTS

| 2002/0008445 | A1 |  | 1/2002 | Pelrine et al. |
| 2007/0216803 | A1 |  | 9/2007 | Eromaki |
| 2008/0144186 | A1 | * | 6/2008 | Feng et al. ................. 359/666 |
| 2008/0308974 | A1 | * | 12/2008 | Pei et al. ..................... 264/479 |
| 2009/0010140 | A1 |  | 1/2009 | Ishii et al. |
| 2009/0161239 | A1 | * | 6/2009 | Verhaar et al. ............. 359/824 |
| 2010/0024180 | A1 | * | 2/2010 | Pei et al. ..................... 29/25.35 |
| 2010/0026143 | A1 | * | 2/2010 | Pelrine et al. .............. 310/366 |
| 2010/0183456 | A1 | * | 7/2010 | Toonder et al. ........... 417/410.1 |

FOREIGN PATENT DOCUMENTS

| JP | 53-24605 | 3/1978 |
| JP | 53-24606 | 3/1978 |

(Continued)

OTHER PUBLICATIONS

Susumu Hara, et al., Highly Stretchable and Powerful Polypyrrole Linear Actuators, Chemical Society of Japan, Chemistry Letters vol. 32, No. 7 (2003), pp. 576-577.

(Continued)

*Primary Examiner* — Rodney E Fuller
(74) *Attorney, Agent, or Firm* — Knobbe, Martens, Olson & Bear, LLP

(57) ABSTRACT

An actuator body and a throttle mechanism that are small and have a simple structure are provided. The actuator body comprises a polymer actuator 11 that bends and deforms by an electric driving source, an intermediate 12 that transmits the bending force of the polymer actuator, and an elastic body 13 to which the bending force is applied through the intermediate, wherein the dimension of a hole portion that is formed in the elastic body 13 changes when the bending force of the polymer actuator 11 is applied onto the elastic body 13 through the intermediate 12.

11 Claims, 2 Drawing Sheets

FOREIGN PATENT DOCUMENTS

| | | | |
|---|---|---|---|
| JP | 2002-332956 | A | 11/2002 |
| JP | 2005-27444 | A | 1/2005 |
| JP | 2006-172635 | A | 6/2006 |
| WO | WO 01/58973 | A2 | 8/2001 |
| WO | WO 2005/012730 | A1 | 2/2005 |
| WO | 2007/108257 | A1 | 9/2007 |
| WO | WO 2007/104829 | A1 | 9/2007 |

OTHER PUBLICATIONS

Supplementary European Search Report issued by European Patent Office dated Aug. 18, 2010 for counterpart European Patent Application No. 08721992.9.

* cited by examiner

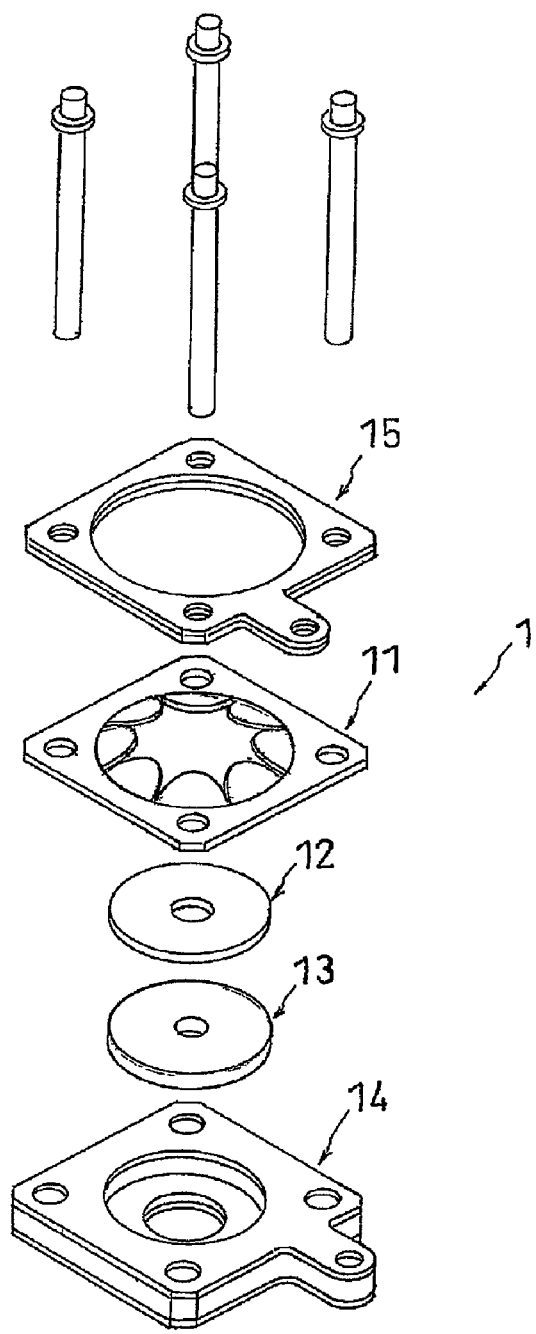
[Fig. 1]

[Fig. 2]
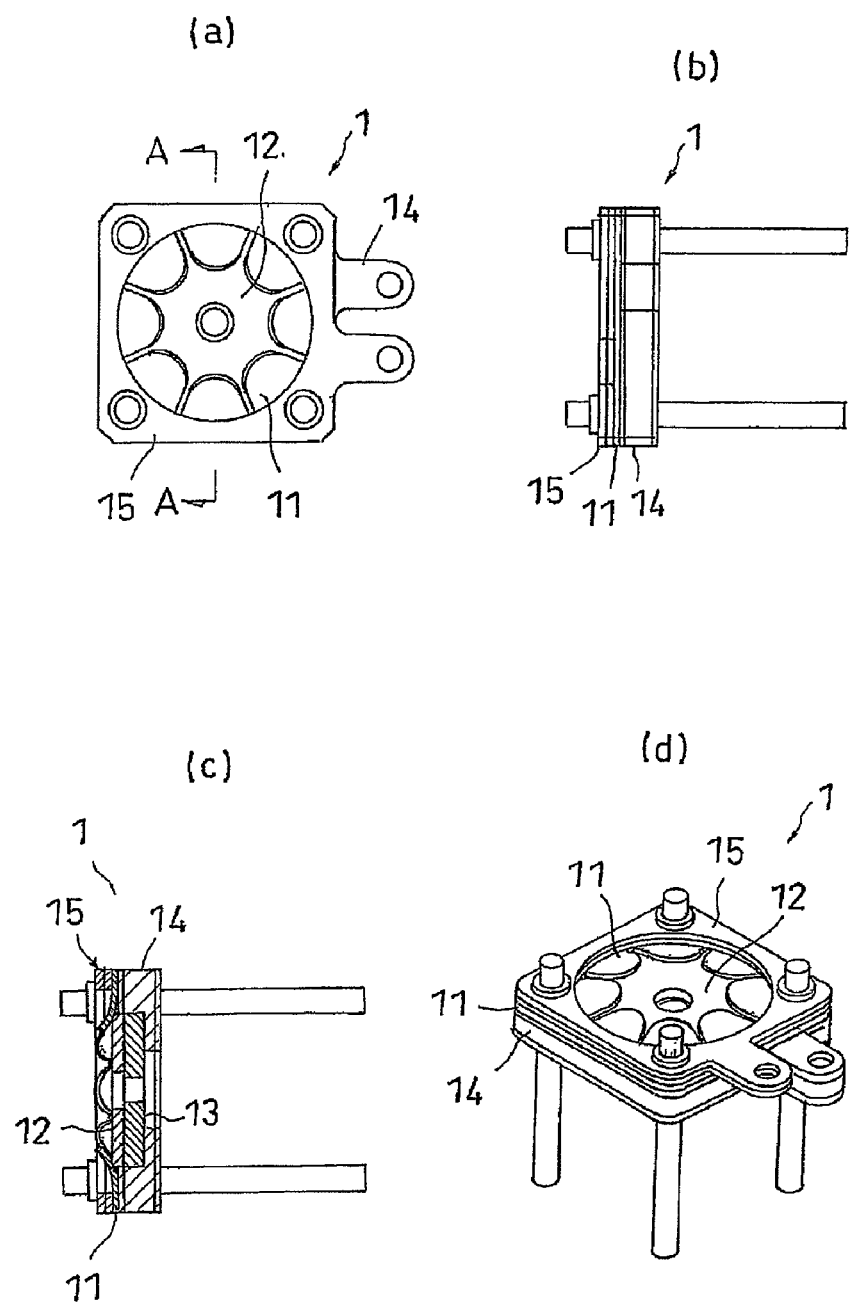

ACTUATOR BODY AND THROTTLE MECHANISM

This application is the U.S. National Phase under 35. U.S.C. §371 of International Application PCT/JP2008/054588, filed Mar. 13, 2008, which claims priority to Japanese Patent Application No. 2007-101760, filed Apr. 9, 2007. The International Application was published under PCT Article 21(2) in a language other than English.

TECHNICAL FIELD

The present invention relates to an actuator body that can deform an elastic body by the action of a polymer actuator element. This actuator is useful in a throttle mechanism that is used in a small and light camera, for example.

BACKGROUND ART

The throttle mechanism used in a camera has a mechanical configuration, and its miniaturization is limited. For example, it is difficult to produce a throttle mechanism having a diameter of 10 mm or less and a thickness of 1 mm or less as a conventional small throttle mechanism, and an ultra-small throttle mechanism having a simple structure is strongly desired that can respond to further miniaturization and reduction of weight for a small information terminal equipped with a camera such as the recent cellular phone equipped with a camera.

A piezoelectric element and a voice coil may be used as driving sources of the throttle mechanism. However, the volume change of the piezoelectric element is limited, and application of a high voltage is necessary. Further, the voice coil has a complicated structure and a large number of components and is heavy, and therefore, its miniaturization is limited.

The present inventors have been broadly examining and investigating the usefulness and application of the polymer actuator. An ion conductive actuator having an ion exchange resin layer and metal electrode layers that are formed on the surfaces of this ion exchange resin layer in an insulated state from each other is known as this polymer actuator (Patent Document 1). This polymer actuator functions as an actuator by application of a potential difference between the metal electrode layers and generating curvature and deformation in the ion exchange resin layer.

Further, a polymer actuator using a conductive polymer is known. Because this actuator is light, the total weight of devices in which it is incorporated can be reduced, and this actuator is expected to be used not only in small driving devices such as a micro machine but also in large driving devices. The actuator is expected to be applied especially to an artificial muscle, a robot arm, an artificial hand, an actuator, and the like. For example, a polymer actuator that uses polypyrrole can exhibit a maximum stretching ratio of 15.1% per one oxidation reduction cycle due to electrolytic stretching, and can generate a force of 22 MPa at maximum (for example, refer to Non-Patent Document 1).

Patent Document 1: Japanese Patent Application Laid-Open No. 2006-172635

Non-Patent Document 1: Susumu Hara and 4 others, "Highly Stretchable and Powerful Polypyrrole Linear Actuators," Chemistry Letters, Japan, Published by the Chemical Society of Japan, 2003, Vol. 32, No. 7, pp. 576-577.

DISCLOSURE OF THE INVENTION

Problems to be solved by the Invention

The present invention was performed in view of the above-described actual conditions and problems, and its object is to provide an actuator body and a throttle mechanism that are small and have a simple structure.

Means for Solving the Problems

In order to solve the above-described problems, the actuator according to the present invention is equipped with a polymer actuator that bends and deforms by an electric driving source, an intermediate that transmits the bending force of the polymer actuator, and an elastic body to which the bending force is applied through the intermediate, and is characterized in that the dimension of a hole portion that is formed in the elastic body changes when the bending force of the polymer actuator is applied onto the elastic body through the intermediate.

According to this configuration, the actuator body is equipped with a polymer actuator that bends and deforms with an electric driving source, an intermediate that transmits the bending force of the polymer actuator, and an elastic body to which the bending force is applied through the intermediate. The polymer actuator is bent and deformed by an electric drive such as application of a voltage, and the bending force at this time is applied onto the elastic body through the intermediate. With this application, the dimension of the hole portion that is formed in the elastic body is varied. The dimensional change of the hole portion differs depending on the application point of the bending force, and when the hole portion is circular for example, the dimension changes so as to shrink in the radial direction of the circle.

Further, in an embodiment of the present invention, the polymer actuator is a polymer actuator that bends and deforms (a bending behavior), and examples thereof include an ion conductive actuator and a conductive polymer actuator. An example of the ion conductive actuator is an actuator that has an ion exchange resin layer and metal electrode layers that are formed on the surfaces of this ion exchange resin layer in an insulated state from each other. Meanwhile, an example of the conductive polymer actuator is a bimorph-type actuator. In the configuration of this bimorph-type actuator, a metal electrode layer is formed on both surfaces of a porous base material containing a driving electrolytic liquid, and a conductive polymer layer is formed on each surface of the metal electrode layer.

Further, the throttle mechanism according to the present invention has a configuration including the above-described actuator body. In the actuator body, when the cross sectional shape of the hole portion of the elastic body is made to be circular and the bending force of the polymer actuator is applied to the elastic body, the diameter of this hole portion becomes small and the elastic body deforms as the throttle mechanism. Further, in order to realize the throttle change of the hole portion or the elastic body accurately without fluctuation, it is required to control the bending deformation of the polymer actuator with high accuracy. This throttle mechanism is useful in various uses, such as a sphygmomanometer for fingers, an artificial anus, a valve, a pump, a brake, a clutch, etc. . . .

Further, the imaging apparatus according to the present invention has a configuration including the above-described throttle mechanism. Examples of the imaging apparatus include a camera, a digital camera, a digital video camera, a cellular phone equipped with a camera, a CCD camera, and a CMOS camera. Especially, in the case of a small information terminal equipped with a camera such as a cellular phone equipped with a camera, the conventional mechanical throttle mechanism cannot be installed. However, the throttle mechanism according to the present invention is useful because ultraminiaturization (for example, a diameter of 10 mm and a thickness of 0.8 to 2.4 mm) is possible.

BRIEF DESCRIPTION OF THE DRAWINGS

FIG. 1 is a drawing for explaining the actuator body of the present invention.

FIG. 2 is a drawing for explaining the actuator body of the present invention.

DESCRIPTION OF THE REFERENCE NUMERALS

| | |
|---|---|
| 1 | Actuator Body |
| 11 | Ion conductive actuator |
| 12 | Washer (Intermediate) |
| 13 | Elastic body |
| 14 | Substrate |
| 15 | Substrate |

BEST MODE FOR CARRYING OUT THE INVENTION

In the following, embodiments of the present invention will be explained in detail.

(Configuration of Polymer Actuator)

The shape of the polymer actuator is not especially limited. However, examples thereof include a chrysanthemum shape (flower shape), a ring shape, and a rectangle in the case that the elastic body has a ring shape. Each flower petal of the chrysanthemum shape acts on the ring-shaped elastic body as a curving behavior of a cantilevered beam (for example, refer to FIG. 2). The production of such a shape can be realized by producing the polymer actuator into a sheet and forming the sheet with a cutting means such as a laser, or the polymer actuator can be produced into a desired shape. The polymer actuator will be described in detail in the following.

(Ion Conductive Actuator)

The ion conductive actuator has a structure in which metal electrode layers are formed on the surfaces of an ion exchange resin layer, more specifically, an ion exchange resin and a liquid organic compound that is a polarizing organic solvent containing a salt or an ionic liquid are contained between the opposing metal electrode layers. Theoretically, a phenomenon is utilized in which the deformation occurs due to the ionic substance in the liquid organic compound that is contained in the ion exchange resin moving in the direction of any one of the electrodes when a potential difference is given to the ion exchange resin through the metal electrodes.

(Ion Exchange Resin)

The ion exchange resin of the polymer actuator element used in the present invention is not especially limited, and a known ion exchange resin can be used. An actuator whose effect has been actually confirmed is an actuator having a positive ion exchange resin as its ion exchange resin. However, the same effect can be expected whether the ion exchange resin is of a positive ion type or a negative ion type by changing the mode of application of the potential difference. In the case of using a positive ion exchange resin, a positive ion exchange resin in which a hydrophilic functional group such as a sulfonic acid group or a carboxyl group is introduced into polyethylene, polystyrene, a fluorine resin, etc. can be used. Examples of such a resin that can be used include a perfluorosulfonic acid resin (trade name "Nafion" manufactured by DuPont), a perfluorocarboxylic acid resin (trade name "Flemion" manufactured by Asahi Glass Co., Ltd.), ACIPLEX (manufactured by Asahi Kasei Corporation), and NEOSEPTA (manufactured by Tokuyama Corp.).

In order to make the bending/displacement amount of the polymer actuator used in the present invention large, the ion exchange resin preferably has flexibility. In order to give the flexibility to the ion exchange resin, the ion exchange resin is swelled with a liquid organic compound. The ion exchange resin can become a gel electrolyte by coming into a swelled state. The degree of the swelling is not especially limited. However, the degree of swelling of the polymer actuator, that is, the ratio of the increase in thickness of the polymer actuator in a swelled state over the thickness of the polymer electrolyte in a dried state, is preferably 3 to 200%, and more preferably 5 to 60%. In the case that the degree of swelling is less than 3%, displacement/bending performance deteriorates, and in the case that the degree of swelling is larger than 200%, the displacement/bending performance also deteriorates and the tensile strength further largely decreases. The organic compound is contained in the ion exchange resin. However, in the case that the metal electrodes are porous, a part of the solvent maybe contained in the metal electrodes together with a salt.

(Liquid Organic Compound)

A polarizing organic solvent containing a salt, or an ionic liquid is used for the liquid organic compound used in the present invention. The ionic liquid can be used alone, however, in the case of the polarizing organic solvent, a salt containing ions that can be a carrier of an electric charge is necessary. However, the above-described ionic liquid may be used as the salt. This is because the movement of the ionic substance easily occurs in the ion exchange resin when the potential difference is given to the ion exchange resin as long as these liquid organic compounds are used. The liquid organic compound is an organic compound that is liquid at a normal temperature and a normal pressure, and preferably a liquid organic compound having a boiling point or a decomposition temperature of 180° C. or more. In this case, vaporization of the solvent hardly occurs.

(Polarizing Organic Solvent)

The polarizing organic solvent is preferably an organic compound having a boiling point or a decomposition temperature of 180° C. or more, and especially preferably a polarizing organic solvent having a boiling point of 245° C. or more. Specific examples of the preferred polarizing organic solvent include diethylene glycol, glycerin, sulfolane, propylene carbonate, butyrolactone, and mixtures thereof. Among these, diethylene glycol, glycerin, sulfolane, and mixtures thereof are especially preferable.

The salt that is contained in the polarizing organic solvent is not especially limited as long as it is a salt that can be dissolved into the polarizing organic solvent. However, especially when the ion exchange resin forms a cation and a counter ion, monovalent to trivalent cation salts can be used, and a monovalent cation such as $Na^+$, $K^+$, and $Li^+$ is preferably used because large bending or displacement can be realized, and an alkyl ammonium ion having a large ion radius is more preferably used because larger bending or displacement can be realized. Examples of the alkyl ammonium ion that can be used include $CH_3N^+H_3$, $C_2H_5N^+H_3$, $(CH_3)_2N^+H_2$, $(C_2H_5)_2N^+H_2$, $(CH_3)_2N^+H$, $(C_2H_5)_3N^+H$, $(CH_2)_4N^+$, $(C_2H_5)_4N^+$, $(C_3H_7)_4N^+$, $(C_4H_9)_4N^+$, $H_3N^+(CH_2)_4N^{+1\ H}{}_3$, $H_2C=CHCH_2N^+HCH_3$, $H_3N^+(CH_2)_4N^+H_2(CH_2)_4N^+H_3$, $HC\equiv CCH_2N^+H_2$, $CH_3CH(OH)CH_2N^+H_3$, $H_3N^+(CH_2)_5OH$, $H_3N^+CH(CH_2OH)_2$, $HOCH_2)_2C(CH_2N^+H_3)_2$, $C_2H_5OCH_2CH_2N^+H_3$, or ammonium ions having aliphatic hydrocarbons as substituents and ammonium ions having cyclic hydrocarbons of alicyclic type as well as hydrocarbons as functional groups. At this time, the concentration of the salt may be equivalent or more than the concentration of the functional group of the ion exchange resin, and is preferably 0.01 to 10 mol/l, and is more preferably 0.1 to 1.0 mol/l to obtain sufficient bending or displacement.

(Ionic Liquid)

A preferred specific example of the ionic liquid is a salt of a combination of at least one cation selected from the group consisting of a teteraalkyl ammonium ion, an imidazolium ion, an alkylpyridinium ion, a pyrazolium ion, a pyrrolium ion, a pyrrolinium ion, a pyrrolidinium ion, and a piperidinium ion and at least one anion selected from the group consisting of $PF_6^-$, $BF_4^-$, $AlCl_4^-$, $ClO_4^-$, and a slufonium imide anion represented by the following Formula (1). In the following Formula (1), n and m are arbitrary integers.

$$C_nF_{(2n+1)}SO_2)(C_mF_{(2m+1)}SO_2)N^- \quad (1)$$

The tetraalkyl ammonium cation is not especially limited, and trimethylpropyl ammonium, trimethylhexyl ammonium, and tetrapentyl ammonium can be used.

A dialkyl imidazolium ion and/or a trialkyl imidazolium ion can be used as the imidazolium cation. The imidazlium cation is not especially limited, and examples thereof include a 1-ethyl-3-methyl imidazolium ion, a 1-hexyl-3-methyl imidazolium ion, a 1-butyl-3-methyl imidazoluim ion, a 1,3-dimethyl imidazolium ion, a 1-methyl-3-ethyl imidazolium ion, a 1,2,3-trimethyl imidazolium ion, a 1,2-dimethyl-3-ethyl imidazoluim ion, a 1,2-dimethyl-3-propyl imidazoluim ion, and a 1-butyl-2,3-dimethyl imidazoluim ion.

The alkylpyridinium cation is not especially limited, and examples thereof include an N-butyl pyridinium ion, an N-methyl pyridiniumion, an N-ethyl pyridiniumion, an N-propyl pyridinium ion, 1-ethyl-2-methylpyridinium, 1-butyl-4-methylpyridinium, and 1-butyl-2,4-dimethyl pyridinium.

The pyrazolium cation is not especially limited, and examples thereof include a 1,2-dimethyl pyrazolium ion, a 1-ethyl-2-methyl pyrazolium ion, a 1-propyl-2-methyl pyrazolium ion, and a 1-butyl-2-methyl pyrazolium ion.

The pyrrolium cation is not especially limited, and examples thereof include a 1,1-dimethyl pyrrolium ion, a 1-ethyl-1-methyl pyrrolium ion, a 1-methyl-l-propyl pyrrolium ion, and a 1-butyl-1-methyl pyrrolium ion.

The pyrrolinium cation is not especially limited, and examples thereof include a 1,2-dimethyl pyrrolinium ion, a 1-ethyl-2-methyl pyrrolinium ion, a 1-propyl-2-methyl pyrrolinium ion, and a 1-butyl-2-methyl pyrrolinium ion.

The pyrrolidinium cation is not especially limited, and examples thereof include a 1,1-dimethyl pyrrolidinium ion, a 1-ethyl-1-methyl pyrrolidinium ion, a 1-methyl-1-propyl pyrrolidinium ion, and a 1-butyl-1-methyl pyrrolidinium ion.

The piperidinium cation is not especially limited, and examples thereof include a 1,1-dimethyl piperidinium ion, a 1-ethyl-1-methyl piperidinium ion, a 1-methyl-1-propyl piperidinium ion, and a 1-butyl-1-methyl piperidinium ion.

The combination of the anion and the cation of the ionic liquid is not especially limited, and examples that can be used include 1-methyl-3-ethyl imidazolium trifluoromethane sulfoimide (EMITFSI), 1-methyl-3-imidazolium tetrafluoroborate ($EMIBF_4$), 1-methyl-3-imidazolium hexafluorophosphate ($EMIPF_6$), trimethylpropyl ammonium trifluoromethane sulfoimide, 1-hexyl-3-methyl imidazoluim tetrafluoroborate, 1-hexyl-3-methyl imidazolium hexafluorophosphate, and 1-hexyl-3-methyl imidazolium trifluoromethane sulfoimide.

(Metal Electrode)

In the present invention, one or more pairs of the metal electrodes are provided in the opposing positions on the surface of the ion exchange resin so as to give a potential difference to the ion exchange resin. Any metal other than a liquid metal such as mercury can be used for the metal electrode without limitation as long as it is a solid metal having good conductivity, and an alloy can also be used. An appropriate metal can be selected individually depending on the type of the ion exchange resin and the liquid organic compound that are used.

The phrase "opposing metal electrodes" refers to a state that one pair of the metal electrodes ideally exist in parallel. However, both electrodes are not necessarily completely parallel to each other, and they may deviate from parallel a little as long as the actuator element can be displaced by applying a voltage to the both metal electrodes. However, when deviated from parallel, a change in the efficiency of the bending and deformation per coulomb amount occurs.

In order to make the state that one pair of the metal electrodes exist in parallel, it is preferable to make the ion exchange resin have a plate or sheet form having parallel plane sidewalls and then to provide the metal electrodes to be paired on the surface of the plane sidewalls that are opposing each other in parallel by a plating method, preferably an electroless plating method. In the case of forming a metal film that can serve as the metal electrode on the surface of the ion exchange resin by an electroless plating method, the contact area between the ion exchange resin and the metal electrode increases, and therefore, the amount of bending and displacement of the actuator can be made large.

(Coating Resin)

The polymer actuator that is used in the present invention can be driven for a long time without being coated. However, it can be coated with a resin having flexibility. The resin is not especially limited but a polyurethane resin and/or a silicon resin can be used. The polyurethane resin is not especially limited, but a flexible thermoplastic polyurethane is especially preferably used because it has a large degree of flexibility and good adhesion. Examples of the flexible thermoplastic polyurethane that can be used include "Asaflex 825" (trade name, degree of flexibility 200%, manufactured by Asahi Kasei Chemicals Corporation), and trade names "Pellethane 2363-80A" (degree of flexibility 550%), "Pellethane 2363-80AE" (degree of flexibility 650%), "Pellethane 2363-90A" (degree of flexibility 500%), and "Pellethane 2363-90AE" (degree of flexibility 550%) that are manufactured by The Dow Chemical Company. Further, the silicon resin is not especially limited, but a resin having a degree of flexibility of 50% or more is especially preferable because it has good adhesion due to the large degree of flexibility. Examples of the silicon resin that can be used include "Silaseal 3FW," "Silaseal DC738RTV," "DC3145," and "DC3140" that are manufactured by Dow Corning Corporation. In the present invention, the degree of flexibility refers to the tensile breaking elongation (Ultimate Elongation %) according to ASTM D412.

An example of the conductive polymer actuator is one having a bimorph-type structure showing the bending behavior. Examples of the bimorph-type structure include a three-layered structure of conductive polymer film/base material/conductive polymer film and a five-layered structure of conductive polymer film/metal electrode/base material/metal electrode/conductive polymer film. Each structure is described in detail in the following.

(Conductive Polymer Material)

The conductive polymer of the present invention is not especially limited as long as its film forming body can stretch by the application of a voltage, and preferably contains pyrrole and/or a pyrrole derivative in the molecular chain.

The conductive polymer is not especially limited as long as the anion as a dopant can be doped into and dedoped from the conductive polymer. As the dopant, a trifluoromethane sulfonate ion, $BF_4^-$, $PF_6^-$, a perchlorate ion, and a perfluoroalkyl sulfonylimide ion can be used depending on the electrolytic stretching amount, the usage, etc. that are necessary.

It is especially preferable to use a film-like conductive polymer in which the above-described conductive polymer is doped with a perfluoroalkyl sulfonylimide ion represented by the following Formula (1) as the above-described conductive polymer:

$$(C_mF_{(2m+1)}SO_2)(C_nF_{(2n+1)}SO_2)N^- \quad (1)$$

[wherein m and n are arbitrary integers],
or to use a film-like conductive polymer in which a perfluoroalkyl sulfonylmethyde ion represented by the following Formula (2) as the above-described conductive polymer:

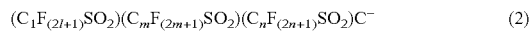

$$(C_lF_{(2l+1)}SO_2)(C_mF_{(2m+1)}SO_2)(C_nF_{(2n+1)}SO_2)C^- \quad (2)$$

[wherein l, m, and n are arbitrary integers],
because a higher driving speed can be obtained.

(Base Material)

The base material of the present invention is not especially limited as long as it is a material that can stretch in its surface direction, and examples thereof include a nonwoven cloth, paper, a cloth, cotton, a membrane material, a woven material, and a knitted material. Further, the base material preferably has an insulating property, can preferably be impregnated with the electrolytic liquid, or can preferably maintain the electrolytic liquid while allowing movement of the liquid. Further, the thickness and the hardness of the base material are not especially limited as long as they are designed so that the base material exhibits a linear displacement function.

Further, the base material is preferably a porous base material (porous support body) such as polytetrafluoroethylene (PTFE), polyamide, polyolefin, or cellulose acetate, for example. Among these, porous polytetrafluoroethylene (porous PTFE), etc. is especially preferably used as the porous base material (porous support body) from the viewpoints of chemical stability, flexibility, and durability in repeated driving of the actuator element. Further, in the case of driving the actuator element in air, it is more preferable that the ion conductivity of the layer (porous base material layer (porous support body layer)) maintaining the electrolytic liquid is high, and the porosity is preferably as high as possible.

(Driving Electrolytic Liquid)

The driving electrolytic liquid that is used in the present invention contains the electrolyte for the polymer actuator element to be driven by the application of a voltage, and is used as a solvent to dissolve the electrolyte. In the present invention, an organic solvent, water, or a mixed solution of an organic solvent and water can be used as the solvent to dissolve the electrolyte. In the present invention, a mixed solution of an organic solvent and an acid or a mixed solution of an organic solvent, water, and an acid can be used as the solvent to dissolve the electrolyte. Further, in the case of using the conductive polymer that has undergone a contact treatment with an acid, an organic solvent or a mixed solution of an organic solvent and water can be used as the solvent that dissolves the electrolyte. By containing these mixed solutions as the driving electrolytic liquid, the polymer actuator element can exhibit a large driving speed in the driving electrolytic liquid in the case of measuring the stretching amount (driving speed) over a time during which a constant voltage is applied.

Further, in the present invention, the organic solvent is preferably a polar organic compound that contains at least one bond or functional group among an ester bond, a carbonate bond, and a nitrile group.

The organic solvent is not especially limited, and a solvent that can be used as an electrochemical reaction field is preferable. Examples of the polar organic compound include γ-butyrolactone, and α-methyl-γ-butyrolactone (the above are organic compounds containing an ester bond), propylene carbonate, ethylene carbonate, dimethyl carbonate, diethyl carbonate, and methylethyl carbonate (the above are organic compounds containing a carbonate bond), and acetonitrile, propionitrile, and succinonitrile (the above are organic compounds containing a nitrile group). The polar organic compounds are preferable because a high stretching speed and a large maximum stretching ratio can be obtained. Among these, propylene carbonate, butyrolactone, acetonitrile, ethylene carbonate, etc. are preferable, and longer durability can be obtained together with well-balanced driving performance.

Further, in the case that the mixed solvent contains water, the mixing ratio of water and the organic solvent is not especially limited. In the case of using a mixed solvent containing water as the solvent of the driving electrolytic liquid, the driving speed can be improved normally to two times or more compared with the case of using only the organic solvent. Further, the organic solvent may be used alone or two types or more may be mixed and used.

It is difficult to specify the mixing ratio of the driving electrolytic liquid depending on the types of the conductive polymer and the organic solvent. Because of an ability of the organic solvent to swell the conductive polymer, etc., the minimum amount of the organic solvent to improve the driving speed depends on the types of the organic solvent. For example, for propylene carbonate, the mixing ratio of water to the organic solvent can be made to be 0.1:99.9 because the content of water in a special grade reagent is 0.005. The range of the preferred mixing ratio of water to the organic solvent in the mixed solvent can be selected from the range of the lower limit of the water content ratio being a value selected from 0.5, 1.0, 5.0, 10, and 20 and from the range of the upper limit of the water content ratio being a value selected from 99.5, 99.0, 95.0, 90.0, and 80.0 in terms of the capacity ratio depending on the type of the organic solvent. The mixing ratio can be obtained by analyzing the driving electrolytic liquid using a measurement method by a gas chromatography method and especially in the case that the water content is small, using a measurement method by a Karl Fisher method.

For example, in the case that the organic solvent is propylene carbonate, the mixing ratio of water to propylene carbonate is preferably 25:75 to 75:25 in terms of capacity ratio because the driving speed due to the application of a voltage to the conductive polymer is increased. In the mixed solvent, a plurality of types of the organic solvent may be used, and in this case, the mixing ratio can be calculated from the ratio of the weight of water to the total weight of the entire organic solvent.

The water is not especially limited. However, it is preferably pure water, distilled water, or ion exchange water because a hindrance factor to the electrolytic stretching due to a metal ion, a chloride ion, etc. is hardly contained.

Further, an anion is contained as the electrolyte in the driving electrolytic liquid. An anion such as a trifluoromethane sulfonate ion, $BF_4^-$, $PF_6^-$, or a perfluoroalkyl sulfonylimide ion can be used as the dopant ion. An example of the anion that maybe used is an electrolyte salt that forms a counter ion with a cation, such as $Na^+$, $K^+$, or $Li^+$.

Examples of the electrolyte salt include a lithium salt, a sodium salt, and a potassium salt of the anion, lithium perfluoroalkyl sulfonylimide, a lithium salt of bistrifluoromethane sulfonylimide, and a tetrabutyl ammonium salt of bistrifluoromethane sulfonylimide.

In the case that the electrolyte salt is added as the electrolyte, the electrolyte salt is contained preferably at 1 to 90 parts by weight, more preferably at 5 to 75 parts by weight, and especially preferably at 10 to 50 parts by weight to 100 parts by weight of the driving electrolytic liquid.

Further, a mixed solution containing an acid can be used as the driving electrolytic liquid. This acid is not especially limited, but it is preferably a monovalent strong acid.

Preferred examples of the acid include perfluoroalkyl sulfonylimide such as $(CF_3SO_2)_2NH$, $(C_2F_5SO_2)_2NH$, or $(CF_3SO_2)(C_2F_5SO_2)NH$, perfluoroalkyl sulfonylmethide such as $(CF_3SO_2)_3CH$, $(C_2F_5SO_2)_3CH$, or $(CF_3SO_2)(C_2F_5SO_2)_2CH$, and an inorganic acid such as nitric acid.

The acid may be used alone or two types or more may be mixed and used, and the pH of the driving electrolytic liquid is preferably 0 to 4, and more preferably 1 to 2. When the pH is 4 or more, it is difficult to obtain a sufficient effect of addition, whereas when the pH is 0 or less, there is a fear that the solvent may decompose. In the case of using the conductive polymer that has undergone a contact treatment with an acid, the acid is not necessarily contained in the driving electrolytic liquid.

Furthermore, an anion is contained in the driving electrolytic liquid. An anion such as a trifluoromethane sulfonate ion, $BF_4^-$, $PF_6^-$, and a perfluoroalkyl sulfonylimide ion can be used as the dopant ion. Even in the case of using these anions, the driving speed of the polymer actuator element containing the conductive polymer can be improved by using the mixed solvent.

Especially, in order to obtain a higher driving speed in the electrolytic liquid, it is more preferable to contain a perfloroalkyl sulfonylimide ion represented by the following Formula (3) in the bulk of the conductive polymer that is contained in the polymer actuator element and to contain the perfluoroalkyl sulfonylimide ion represented by the following Formula (3) also in the driving electrolytic liquid:

$$(C_mF_{(2m+1)}SO_2)(C_nF_{(2n+1)}SO_2)N^- \qquad (3)$$

[wherein m and n are arbitrary integers].

Furthermore, in order to obtain a higher driving speed in the driving electrolytic liquid, it is more preferable to contain a perfloroalkyl sulfonylmethide ion represented by the following Formula (4) in the bulk of the conductive polymer that is contained in the polymer actuator element and to contain the perfluoroalkyl sulfonylmethide ion represented by the following Formula (4) also in the driving electrolytic liquid:

$$(C_1F_{(2l+1)}SO_2)(C_mF_{(2m+1)}SO_2)(C_nF_{(2n+1)}SO_2)C^- \qquad (4)$$

[wherein l, m, and n are arbitrary integers].

Because the perfluoroalkyl sulfonylimide ion or the perfluoroalkyl sulfonylmethide ion is captured into or discharged from the bulk of the conductive polymer due to inclusion of these dopant ions and the conductive polymer can perform a large stretching movement, the polymer actuator element can exhibit a higher driving speed than in the electrolytic stretching method of the conventional conductive polymer.

Further, in the present invention, a solution containing a non-ionic organic compound that is liquid under a normal temperature and a normal pressure can be used as a solvent that dissolves the electrolyte. The non-ionic organic compound is not especially limited and any non-ionic organic compound can be appropriately used as long as it does not have an ionic functional group or an ionic site in the molecular structure. The organic compound may be an organic compound that can serve as a solvent of a salt containing ions that serve as a charge carrier or an organic compound that can serve as a charge carrier. The non-ionic organic compound preferably has a boiling point or a decomposition temperature of 180° C. or more and is liquid under a normal temperature and a normal pressure, and also preferably has a function as a solvent. Further, the non-ionic organic compound is more preferably an organic solvent having a boiling point of 245° C. or more. These compounds may be used alone or two types or more may be mixed and used.

Examples of the non-ionic organic compound include diethylene glycol, glycerin, sulfolane, propylene carbonate, butyrolactone, acetonitrile, ethylene carbonate, and polyether compounds. Among these, diethylene glycol, glycerin, sulfolane, propylene carbonate, butyrolactone, and polyether compounds are preferable, for example, and it is especially preferable to use a polyether compound because longer durability can be obtained together with well-balanced driving performance.

The non-ionic organic compound may be used alone or two types or more may be mixed and used. The compounding amount is preferably 0.01 to 100 parts by weight, more preferably 0.05 to 50 parts by weight, and further preferably 0.1 to 30 parts by weight to 100 parts by weight of the electrolytic liquid. When the amount is less than 0.01 part by weight, there is a case that sufficient durability over time cannot be obtained, and when it exceeds 100 parts by weight, there is a case that the driving frequency decreases.

Further, an anion can be contained as the electrolyte in the driving electrolytic liquid. An anion such as a trifluoromethane sulfonate ion, $BF_4^-$, $PF_6^-$, or a perfluoroalkyl sulfonylimide ion can be used as the dopant ion. An example of the anion that maybe used is an electrolyte salt that forms a counter ion with a cation, such as $Na^{30}$, $K^+$, or $Li^+$.

Examples of the electrolyte salt include a lithium salt, a sodium salt, and a potassium salt of the anion, lithium perfluoroalkyl sulfonylimide, a lithium salt of bistrifluoromethane sulfonylimide, and a tetrabutyl ammonium salt of bistrifluoromethane sulfonylimide.

In the case that the electrolyte salt is added as the electrolyte, the electrolyte salt is contained preferably at 1 to 90 parts by weight, more preferably at 5 to 75 parts by weight, and especially preferably at 10 to 50 parts by weigh to 100 parts by weight of the driving electrolytic liquid.

An ionic liquid can be further contained in the driving electrolytic liquid in the present invention. The ionic liquid can be used without special limitation. Above all, the ionic liquid preferably contains a salt of a combination of at least one cation selected from the group consisting of an imidazoluim ion such as a teteraalkyl ammonium ion, a dialkylimidazolium ion, or a trialkylimidazolium ion, a pyrazolium ion, a pyrrolium ion, a pyrrolinium ion, a pyrrolidinium ion, and a piperidinium ion and at least one anion elected from the group consisting of $PF_6^-$, $BF_4^-$, $AlCl_4^-$, $ClO_4^-$, and a slufonium imide anion represented by the following Formula (5). These ionic liquids may be used alone or two types or more may be mixed and used.

$$(C_mF_{(2m+1)}SO_2)(C_nF_{(2n+1)}SO_3)N^- \qquad (5)$$

[In the above formula (5), m and n are arbitrary integers.]

Furthermore, in order to obtain a higher driving speed in the driving electrolytic liquid, it is more preferable to contain a perfloroalkyl sulfonylimide ion represented by the following Formula (6) in the bulk of the conductive polymer that is contained in the polymer actuator element and to contain the perfluoroalkyl sulfonylimide ion represented by the following Formula (6) also in the driving electrolytic liquid:

$$(C_mF_{(2m+1)}SO_2)(C_nF_{(2n+1)}SO_2)N^- \quad (6)$$

[wherein m and n are arbitrary integers].

Further, in order to obtain a higher driving speed in the electrolytic liquid, it is more preferable to contain a perfloroalkyl sulfonylmethide ion represented by the following Formula (7) in the bulk of the conductive polymer that is contained in the polymer actuator element and to contain the perfluoroalkyl sulfonylmethide ion represented by the following Formula (7) also in the driving electrolytic liquid:

$$(C_lF_{(2l+1)}SO_2)(C_mF_{(2m+1)}SO_2)(C_nF_{(2n+1)}SO_2)C^- \quad 97)$$

[wherein l, m, and n are arbitrary integers].

Because the perfluoroalkyl sulfonylimide ion or the perfluoroalkyl sulfonylmethide ion is captured into or discharged from the bulk of the conductive polymer due to inclusion of these dopant ions and the conductive polymer can perform a large stretching movement, the polymer actuator element can exhibit a higher driving speed than in the electrolytic stretching method of the conventional conductive polymer.

Moreover, in the actuator element of the present invention, an anion that is the same as the anion contained in a conductive polymer tangible object having a specific shape and containing the conductive polymer is preferably contained in the driving electrolytic liquid. With an anion that is the same as the anion that is contained in the bulk of the conductive polymer that is used in the actuator element and that functions as a dopant being contained in the driving electrolytic liquid, the ions can easily go in and out of the conductive polymer bulk, and electrolytic stretching with a desired stretching amount can be easily obtained. Further, in the case that the anion that is contained in the driving electrolytic liquid is a perfluoroalkyl sulfonylimide ion or a persfluoroalkyl sulfonylmethide ion, the ion radius of this anion is preferably about the same as that of the perfluoroalkyl sulfonylimide ion or the perfluoroalkyl sulfonylmethide ion that is contained in the electrolytic liquid for manufacturing the conductive polymer tangible object that undergoes electrolytic stretching in the driving electrolytic liquid because the electrolytic stretching can be performed easily.

(Method of Manufacturing Conductive Polymer Actuator)

A conductive polymer film that is obtained on a working electrode by electrolytic polymerization can be used as it is as the conductive polymer actuator. Alternatively, the conductive polymer layer (film) can be formed by performing the electrolytic polymerization directly onto the base material. Further, conductive polymer layers (films) can be formed on both surfaces of the base material at the same time. Still further, a conductive polymer layer (film) having a high density can be formed on one side of the base material and a conductive polymer layer (film) having a low density can be formed on the other surface at the same time or individually. In such a case, the conductive polymer layer (film) corresponds to the conductive polymer actuator, and the conductive polymer layer (film) having a low density corresponds to a follower counter electrode.

Further, the formation of the conductive polymer layer (film) by electrolytic polymerization is more preferably performed with a metal electrode layer in between rather than forming the conductive polymer layer (film) directly onto the base material. Gold, platinum, nickel, etc. can be used as the metal electrode layer. Among these, gold and platinum are preferable. The metal electrode layer can be formed on the base material by a known method, and the electrode layer can be formed on the base material by sputtering, for example. The thickness of the electrode layer is not especially limited.

Further, the electrolytic liquid that is used in the electrolytic polymerization (electrolytic liquid for manufacturing the conductive polymer) preferably contains an organic compound containing at least one bond or functional group among an ether bond, an ester bond, a carbonate bond, a hydroxyl group, a nitro group, a sulfone group, and a nitrile group and/or halogenated hydrocarbons. The obtained conductive polymer exhibits large electrolytic stretching per one oxidation reduction cycle by containing the solvent and further containing a perfluoroalkyl sulfonylimide ion or a perfluoroalkyl sulfonylmethide ion, etc. in the electrolytic liquid.

Examples of the organic compound include 1,2-diemthoxyethane, 1,2-diethoxyethane, tetrahydrofuran, 2-methyltetrahydofuran, and 1,4-dioxane (the above are organic compounds containing an ether bond), γ-butyrolactone, ethyl acetate, n-butyl acetate, t-butyl acetate, 1,2-diacetoxyethane, 3-methyl-2-oxazolidinone, methyl benzoate, ethyl benzoate, butyl benzoate, dimethyl phthalate, and diethyl phthalate (the above are organic compounds containing an ester bond), propylene carbonate, ethylene carbonate, dimethyl carbonate, diethyl carbonate, and methyl ethyl carbonate (the above are organic compounds containing a carbonate bond), ethylene glycol, butanol, 1-hexanol, cyclohexanol, 1-octanol, 1-decanol, 1-dodecanol, and 1-octadecanol (the above are organic compounds containing a hydroxyl group), nitromethane, and nitrobenzene (the above are organic compounds containing a nitro group), sulfolane, and dimethylsulfone (the above are organic compounds containing a sulfone group), and acetonitrile, butylonitrile, and benzonitrile (the above are organic compounds containing a nitrile group). The organic compound containing a hydroxyl group is not especially limited. However, it is preferably a polyhydric alcohol or a monohydric alcohol having 4 or more carbon atoms because the stretching ratio is good. The organic compound may be an organic compound containing an arbitrary combination of two or more bonds or functional groups among an ether bond, an ester bond, a carbonate bond, a hydroxyl group, a nitro group, a sulfone group, and a nitrile group in a molecule other than the above-described examples.

Further, the halogenated hydrocarbons that is contained as a solvent in the electrolytic liquid for manufacturing the conductive polymer is a hydrocarbon in which at least one hydrogen atom in the hydrocarbon is substituted by a halogen atom, and it is not especially limited as long as it can exist stably as a liquid under the electrolytic polymerization condition. Examples of the halogenated hydrocarbon include dichloromethane and dichloroethane. One type of the halogenated hydrocarbon can be used alone as a solvent in the electrolytic liquid for manufacturing the conductive polymer, and two types of more can also be used together. Further, the halogenated hydrocarbon may be used as a mixed liquid with the organic compound, and a mixed solvent with the organic solvent can be used as a solvent in the electrolytic liquid for manufacturing the conductive polymer.

The perfluoroalkyl sulfonylimide ion or the perfluoroalkyl sulfonylmethide ion that is used in the electrolytic polymerization exists in the bulk of the conductive polymer that is obtained by the electrolytic polymerization. The conductive polymer containing the perfluoroalkyl sulfonylimide ion or the perfluoroalkyl sulfonylmethide ion is preferable because it has a large stretching amount per one oxidation reduction cycle and a large value of the driving speed (%/s) as described above and it can be obtained easily. For example, in a film body of the tangible object of the conductive film, the electrolytic stretching of the conventional conductive polymer is only obtained with its maximum stretching ratio being about 10 to 15% in the surface direction per one oxidation reduction cycle. On the contrary, an excellent maximum stretching ratio of 16% or more, especially 20% or more per one oxidation reduction cycle can be exhibited in the length direction by including the perfluoroalkyl sulfonylimide ion or the perfluoroalkyl sulfonylmethide ion in the bulk of the conductive polymer as a dopant. The film body can be suitably used in a usage for which a large stretching ratio is desired, such as represented by an artificial muscle. Besides the dopant, the tangible object of the conductive polymer can appropriately contain a conductive material such as a metal or and a conductive oxide in order to decrease the resistance value as the working electrode.

The content of the perfluoroalkyl sulfonylimide ion or the perfluoroalkyl sulfonylmethide ion in the electrolytic liquid in the electrolytic polymerization is not especially limited. However, in order to secure sufficient ion conductivity of the electrolytic liquid, the ion is preferably contained at 1 to 40% by weight and more preferably at 2.8 to 20% by weight as a perfuloroalkyl sulfonylimide salt in the electrolytic liquid. In order to improve the quality of the conductive polymer film that is obtained by the electrolytic polymerization method, a composite electrolyte in which the trifluoromethane sulfonate salt is added into the electrolyte liquid at 1 to 80% can be used. Further, these ions may be used alone or two types or more may be mixed and used.

Further, a monomer of the conductive polymer may be further contained as well in the electrolytic liquid (electrolytic liquid for manufacturing the conductive polymer) that is used in the electrolytic polymerization method besides the perfrluoroalkyl sulfonylimide salt, and other known additives such as polyethylene glycol and polyacrylamide can be further contained.

A known electrolytic polymerization method can be used as the electrolytic polymerization method of the conductive polymer monomer in the electrolytic polymerization method, and any of a constant potential method, a constant current method, and an electric sweep method can be appropriately used. For example, the electrolytic polymerization method can be performed at a current density of 0.01 to 20 mA cm$^{-2}$ and a reaction temperature of −70 to 80° C., and it is preferably performed under a condition of a current density of 0.1 to 2 mA cm$^{-2}$ and a reaction temperature of −40 to 40° C., and more preferably a condition of a temperature of −30 to 30° C. in order to obtain a conductive polymer having a good film quality.

The working electrode that is used in the electrolytic polymerization method is not especially limited as long as it can be used in the electrolytic polymerization, and an ITO glass electrode, a carbon electrode, a metal electrode, etc. can be appropriately used. The metal electrode is not especially limited as long as it is an electrode having a metal as a main component. However, an electrode of a single metal or an alloy of a metal element selected from the group consisting of Pt, Ti, Ni, Au, Ta, Mo, Cr, and W can be suitably used. Among these, a metal type that is contained in the metal electrode is especially preferably Pt and Ti because the stretching ratio and generation force of the obtained conductive polymer are large and the electrode can be obtained easily. Examples of the alloy that can be used include trade names "INCOLOY alloy 825," "INCONEL alloy 600, " and "INCONEL alloy X-750" (the above are manufactured by Daido-Special Metals Ltd.). Further, a known electrode such as Pt and Ni can be suitably used as the counter electrode.

The monomer of the conductive polymer that is contained in the electrolytic liquid that is used in the electrolytic polymerization method is not especially limited as long as it is a compound that changes into a polymer by the oxidation due to the electrolytic polymerization and exhibits conductivity. Examples thereof include a 5-membered heterocyclic compound such as pyrrole, thiophene, or isothianaphthene, and a derivative such as an alkyl group or an oxyalkyl group thereof. Among these, a 5-membered heterocyclic compound such as pyrrole or thiophene and a derivative thereof are preferable, and a conductive polymer containing pyrrole and/or a pyrrole derivative is especially preferable because it can be manufactured easily and it is stable as a conductive polymer. These compounds may be used alone or two types or more may be mixed and used.

In the actuator element, the thickness of the conductive polymer layer (film) is appropriately designed according to the specification of the device, and an example thereof is a value in the range of 0.01 to a few hundred μm.

(Intermediate)

The intermediate transmits the bending force due to the bending change of the polymer actuator to the elastic body. Depending on the usage of the actuator body, its size and material are determined. From the viewpoint of the transmission function, a material having stiffness that does not deform by the bending force of the polymer actuator is preferable, and examples thereof include a metal such as stainless steel and a hard resin. In the case that the elastic body has a ring shape, the intermediate is formed also in a ring shape, and its outer diameter is preferably the same as or slightly smaller than that of the elastic body and the ring inner diameter of the intermediate is preferably the same as or slightly larger than the diameter of the hole portion of the elastic body. Although depending on the material, the thickness of the intermediate should be at a level at which the intermediate does not deform. Further, the material is selected that does not have a harmful influence on the polymer actuator and the elastic body.

(Elastic Body)

The elastic body necessarily has resilience and a hardness at a level at which it deforms by the bending force of the polymer actuator. Furthermore, an elastic body that is stable against heat, chemicals, etc. is more preferable. Examples of the material of the elastic body include silicone, a fluorine elastomer, various elastomers, rubbers, and urethanes. The hardness of the elastic body can be measured in accordance with the Shore hardness or the penetration degree (JIS K2207) depending on its material. A throttle behavior can be realized by making the elastic body have a ring shape, a letter C shape, or a letter U shape. Especially, in the case of using the elastic body for the throttle mechanism of a camera, a ring shape is selected. Further, the thickness of the elastic body can be set in accordance with the throttle size.

(Electric Driving Source)

The polymer actuator changes in its bending by the application of a voltage from the electric driving source. The method of applying a voltage is not especially limited, and it is selected depending on the usage of the actuator body. Examples of the method of controlling the voltage that is applied include a switching of positive and negative polarities, voltage value control, pulse control, continuous application of a voltage, intermittent application of a voltage, frequency control, and PID control. In the present invention, stretching occurs in proportion to the time (period) of the application of a voltage. Therefore, by controlling the application time of the voltage, the throttle amount can be controlled easily.

Further, the voltage that is applied differs depending on the material of the polymer actuator, and in the case of an ion conductive actuator, it can be driven at a voltage in the range of −5 to +5 V, for example. In the case of a conductive polymer actuator, application of a voltage is possible in a range that the actuator does not decompose. The voltage that is applied depends on the design of the size and the performance of the device, and the material, the thickness, the size, etc. of the conductive polymer actuator. However, in the case of using polypyrrole as the conductive polymer, the voltage value is desirably a value at which polypyrrole does not decompose or lower, and an example thereof is a value in the range of 0.75 to 2 V.

(Electrode Member)

The electrode member is used to apply a voltage to the polymer actuator. Its shape and size are not especially limited, and the electrode member can be appropriately designed into a circle, a square, a polygon, a deformed shape, a plate, etc. in accordance with the usage. Further, the electrode member can be constituted with a solid material or a flexible material, and a material in accordance with the usage as an actuator can be selected. Further, the electrode member is not especially limited as long as its function is exhibited. Examples thereof include a metal and a noble metal. The electrode member is formed on the surface of a pair of regulating members described later, and the elastic body/intermediate/polymer actuator are preferably sandwiched between this pair of regulating members.

(Regulating Member)

The regulating member has a pair of members and is configured to sandwich the elastic body/intermediate/polymer actuator in this order to form these integrally with a fixing member. A housing part that houses the elastic body and the intermediate is formed in the first regulating member of the pair of regulating members, and when the bending force of the polymer actuator acts on the intermediate, the force is transmitted to the elastic body through the intermediate, and accordingly, the elastic body deforms. At this time, the stretch of the elastic body in the radius direction is regulated due to the inner wall of the housing part of the first regulating member, but the stretching deformation of the hole portion of the elastic body is not regulated. The material of the pair of regulating members is not especially limited. and it is preferably a hard resin, a metal, etc. The shape and the size of the pair of regulating members are not especially limited, and they can be appropriately designed in accordance with the usage of the actuator body. An example of the fixing member is a mechanical fixing member such as a bolt or a nut, and a fixing means such as an adhesive, deposition, and welding can be used in place of the fixing member. Further, the pair of regulating members can be configured to have a fit-in structure or a screw fastening structure.

(Usage)

The actuator body of the present invention can be used as an actuator of a throttle mechanism, a sphygmomanometer for fingers, an artificial anus, a valve, a pump, a massaging machine, a brake, a clutch, etc.

The actuator body of the present invention can be preferably used more specifically in OA equipment, an antenna, a device for carrying a person such as a bed or a chair, medical equipment, an engine, optical equipment, a fixing tool, a side trimmer, a vehicle, an elevator, a food processing device, a cleaning device, measurement equipment, inspection equipment, controlling equipment, a working machine, a processing machine, electronic equipment, an electron microscope, an electric razor, an electric tooth brush, a manipulator, a mast, a game device, amusement equipment, a simulating device for an automobile, a holding device of a vehicle crew member and an accessory equipment extending device for an aircraft, a valve that is used in general equipment including the above-described equipment such as OA equipment and measurement equipment, and a driving part that generates a linear driving force or a driving part that generates a driving force to move a track type orbit consisting of a circular-arc part or a pressing part that linearly moves or moves in a curve in a brake and a lock device.

Further, other than the above-described devices, equipment, instruments, etc., in mechanical instrument in general, the actuator body can be preferably used as a driving part of a positioning device, a driving part of a posture controlling device, a driving part of an elevator, a driving part of a carrying device, a driving part of a moving device, a driving part of a regulating device of an amount, a direction, etc., a driving part of an adjusting device of an axis etc., a driving part of a guiding device, a driving part that generates a linear driving force or a driving part that generates a diving force to move a track type orbit consisting of a circular-arc part or a pressing part that linearly moves or moves in a curve in a pressing part of a pressing device.

Further, the actuator body can be preferably used in a driving part that gives rotary motion to a joint part or a joint that can directly drive such as a joint intermediate member as a driving part in a joint device.

For example, the actuator body can be preferably used in a driving part of a vibration isolation device that damps the vibration that is transmitted from a vibration generating part such as an engine to a vibration accepting part such as a frame, a driving part of a valve moving device for a suction and exhaust valve of an internal combustion engine, a driving part of a fuel controlling device of an engine, and a driving part of a fuel supplying device of an engine such as a diesel engine.

The actuator can be preferably used in a pressing part of a fixing tool to fixedly caulk hose metal fittings to a hose main body, etc., for example.

For example, the actuator body can be preferably used in a driving part of a coil, etc. of the suspension of an automobile, a driving part of a fuel filler lid opener that unlocks a fuel filler lid of a vehicle, a driving part for driving an extension and a pulling-in of a bulldozer blade, and a driving part of a driving device to automatically switch the gear ratio of a transmission for an automobile and to automatically connect and disconnect a clutch.

The actuator body can be preferably used in a driving part of a delivering amount regulating mechanism of a nozzle device for delivering food of a food processing device, for example.

The actuator body can be used in a driving part of a valve that is used in a machine in general including the above-described equipment for example, and can be used preferably in a driving part of a valve of a re-liquefying device of an evaporated helium gas, a driving part of a bellows type pressure sensitive control valve, a driving part of an opening device that drives a heald frame, a driving part of a vacuum gate valve, a driving part of a solenoid operating type controlling valve for a hydraulic system, a driving part of a valve in which a motion transmitting device is incorporated and which uses a pivot lever, a driving part of a valve of a mobile nozzle of a rocket, a driving part of a backflow valve, and a driving part of a pressure-regulating valve part, for example.

The actuator body can be used as a pressing part of a brake that is used in machine in general including the above-described equipment for example, and can be preferably used in a pressing part of a controlling device that is preferably used in a brake for emergency, for safety, for stopping, etc. and a brake for an elevator and a pressing part of a brake structure or a brake system, for example.

The actuator body can be used as a pressing part of a lock device that is used in machine in general including the above-described equipment, and can be preferably used in a pressing part of a mechanical lock device, a pressing part of a steering lock device for a vehicle, and a pressing part of a power transmission device that has both a load restricting mechanism and a connection releasing mechanism, for example.

EXAMPLE

In the following, an example is explained that specifically shows the configuration and the effect of the present invention. It is needless to say that the present invention is not limited to the following example and extends to all modes, embodiments, products, and parts that have the same technical idea as that of the present invention.

Example 1

An ion conductive actuator was produced in a sheet, and it was cut into a chrysanthemum shape by a laser process. The chrysanthemum-shaped ion conductive actuator 11 shown in FIG. 1 has outer diameter dimensions of 9.5 mm in each lengthwise and crosswise direction and 0.2 mm in thickness. Pin holes in which a guide pin is to be inserted were formed in the four corners, and a pierced opening was formed in a central part so that 8 flower petals are opposing to the center of the opening.

The outer diameter of a washer 12 (corresponds to the intermediate) is the same as that of an elastic body 13, and the inner diameter of the washer 12 was made to be 1.05 mm, so that is it was slightly larger than that (1 mm) of the elastic body 13.

The elastic body 13 was formed in a ring using silicone (containing fluorine) (SIFEL-8270 manufactured by Shin-Etsu Chemical Co., Ltd.) as a material. Its thickness was 0.8 mm. The elastic body 13 was formed by pouring silicone into the circular opening (having a piercing part in its center portion) provided in a substrate 14 (corresponds to the regulating member) and curing the silicone. At this time, silicone was poured into the center piercing part of the opening after sealing a pin (having a diameter of 1 mm) with a plate that was provided vertically, and then the washer 12 was inserted into the pin to keep it still on the top face of the poured silicone. At this time, silicone and the washer 12 were housed inside the opening of the substrate 14, and a part of the washer 12 was sticking out of the opening. Then, it was kept still until the silicone cured, and after curing, the plate was removed from the substrate 14. Because the pin was provided vertically in the center position of the opening, a hole portion having a diameter of 1 mm was formed in the center part of the elastic body 13 when the plate was removed after the silicone was cured.

Electrode films (gold-plated copper foil parts) were formed on portion contacting the chrysanthemum-shaped ion conductive actuator 11 on one surface of substrates 14, 15. Glass-epoxy print substrates were used as the substrates 14, 15.

The washer 12 was loaded on the elastic body 13 that was produced as described above. An actuator body 1 was produced by loading the chrysanthemum-shaped ion conductive actuator 11 on this washer 12, loading the substrate 15, and assembling these integrally with a guide pin. It was configured so that each flower petal of the chrysanthemum shape contacted a cantilever against the washer 12. With this cantilever exhibiting the curving behavior (bending behavior of the ion conductive actuator 11), the washer 12 pressed the elastic body 13 below, and stretching deformation of the hole portion of the elastic body 13 was realized. As shown in FIG. 2, the dimension of the outer diameter of the actuator body 1 was 9.5 mm in each lengthwise and crosswise direction and 2.4 mm in thickness. The weight was about 0.8 g·f.

A voltage was applied on a selvage that was formed on a part of the substrates 14, 15. It was confirmed that the diameter of the hole portion in the center part of the fluorine elastomer body 13 changed to 0.5 mm from 1 mm by applying a direct-current voltage of −3 to +3 V. The time from the start to the end of the change was about 4 seconds.

From the above result, it was confirmed that the actuator body 1 can be formed in a small size and it can function effectively as a throttle mechanism. Further, from this result, it was found that the size of the actuator body 1 can be made smaller, and it can be 6.5 mm in each lengthwise and crosswise direction and 0.8 mm in thickness, for example. Further, in the case of using the actuator body 1 as a throttle mechanism, it was confirmed that it is preferable in the respects of downsizing, weight saving, reduction of the number of parts, and low power drive compared to other throttle mechanisms.

The invention claimed is:

1. An actuator body comprising
a polymer actuator that bends and deforms by an electric driving source,
an intermediate that transmits the bending force of the polymer actuator, and
an elastic body to which the bending force is applied through the intermediate, wherein
the dimension of a hole portion that is formed in the elastic body changes when the bending force of the polymer actuator is applied onto the elastic body through the intermediate.

2. The actuator body according to claim 1, wherein the polymer actuator is an ion conductive actuator.

3. The actuator body according to claim 2,
wherein the ion conductive actuator is sandwiched between metal electrode layers.

4. The actuator body according to claim 3, wherein a degree of swelling of the ion exchange resin is 3 to 200%.

5. The actuator body according to claim 3, wherein the liquid organic compound is a polarizing organic solvent containing a salt or an ionic liquid.

6. The actuator body according to claim 5, wherein the ion exchange resin forms a cation and a counter ion and the salt is monovalent to trivalent cation salt.

7. The actuator body according to claim 5, wherein the ionic liquid is a salt of a combination of at least one cation selected from the group consisting of a teteraalkyl ammonium ion, an imidazolium ion, an alkylpyridinium ion, a pyrazolium ion, a pyrrolium ion, a pyrrolinium ion, a pyrrolidinium ion, and a piperidinium ion and at least one anion selected from the group consisting of PF6−, BF4−, AlC14−, ClO4−, and a slufonium imide anion represented by Formula (1):

$$(C_nF_{(2n+1)}SO_2)(C_mF_{(2m+1)}SO_2)N^- \tag{1}$$

wherein n and m are arbitrary integers.

8. The actuator body according to claim 1, wherein the polymer actuator is a conductive polymer actuator.

9. The actuator body according to claim 8 wherein the conductive polymer actuator comprises a conductive polymer which comprises a pyrrole and/or a pyrrole derivative as a constituent unit, and an anion as a dopant that can be doped thereinto and dedoped therefrom.

10. The actuator body according to claim 9, wherein the conductive polymer is a film-like conductive polymer in which the conductive polymer is doped with a perfluoroalkyl sulfonylimide ion represented by Formula (1):

$$(C_nF_{(2n+1)}SO_2)(C_mF_{(2m+1)}SO_2)N^- \quad (1)$$

wherein n and m are arbitrary integers, or with a perfluoroalkyl sulfonylmethyde ion represented by the following Formula (2):

$$(C_lF_{(2l+1)}SO_2)(C_mF_{(2m+1)}SO_2)(C_nF_{(2n+1)}SO_2)C^- \quad (2)$$

wherein l, m, and n are arbitrary integers.

11. A method of deforming an elastic body, comprising:

providing an actuator body according to claim 1, providing electricity to the polymer actuator, thereby bending and deforming the polymer actuator, transmitting the bending force of the polymer actuator to the intermediate, and applying the bending force thorough the intermediate to the elastic body of the hole portion thereby changing the dimension formed in the elastic body.

* * * * *